US009880641B2

United States Patent
Bostick et al.

(10) Patent No.: US 9,880,641 B2
(45) Date of Patent: Jan. 30, 2018

(54) MANAGING DISPLAYED CONTENT ON A RESHAPED FLEXIBLE DISPLAY

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 14/837,231

(22) Filed: Aug. 27, 2015

(65) Prior Publication Data

US 2017/0060265 A1    Mar. 2, 2017

(51) Int. Cl.
*G06F 3/0346* (2013.01)
*G06F 1/16* (2006.01)
(Continued)

(52) U.S. Cl.
CPC .......... *G06F 3/0346* (2013.01); *G06F 1/1652* (2013.01); *G06F 1/1684* (2013.01); *G06F 1/1694* (2013.01); *G06F 3/012* (2013.01); *G09G 3/00* (2013.01); *G09G 3/20* (2013.01); *G09G 2380/02* (2013.01)

(58) Field of Classification Search
None
See application file for complete search history.

(56) References Cited

U.S. PATENT DOCUMENTS 6,340,957 B1   1/2002   Adler et al.
2008/0291225 A1*  11/2008   Arneson ................ G06F 3/011
                                                       345/698
(Continued)

FOREIGN PATENT DOCUMENTS

GB      2370657 A       3/2002
WO   2015015048 A1      2/2015

OTHER PUBLICATIONS

Anonymous, "Face Detection Technology", FUJIFILM Corporation, Jun. 25, 2015. <http://www.fujifilm.com/image_intelligence/photography/face_detection_technology/>, pp. 1-2.

(Continued)

*Primary Examiner* — David D Davis
(74) *Attorney, Agent, or Firm* — John R. Pivnichny; Law Office of Jim Boice

(57) ABSTRACT

A computer-implemented method manages displayed content on a reshaped flexible display. One or more processors detect a location of a bend in a flexible display, where the bend reshapes the flexible display to define at least two sections of the flexible display. One or more processors identify a type of application being used to generate content that is displayed on the flexible display, and then divide the content into a first content portion and a second content portion, based on the type of application being used. One or more processors then display the first content portion on a first section of the flexible display and the second content portion on a second section of the flexible display.

20 Claims, 4 Drawing Sheets

(51) Int. Cl.
*G09G 3/20* (2006.01)
*G06F 3/01* (2006.01)
*G09G 3/00* (2006.01)

(56) References Cited

U.S. PATENT DOCUMENTS

| | | |
|---|---|---|
| 2010/0182265 A1 | 7/2010 | Kim et al. |
| 2013/0176248 A1* | 7/2013 | Shin ................. G06F 3/041 345/173 |
| 2013/0222432 A1* | 8/2013 | Arrasvuori ............ G06F 3/0487 345/660 |
| 2013/0342509 A1 | 12/2013 | Kang et al. |
| 2014/0002419 A1 | 1/2014 | Thorson et al. |
| 2014/0022212 A1 | 1/2014 | Vartanian |
| 2014/0055429 A1 | 2/2014 | Kwon et al. |
| 2014/0071043 A1* | 3/2014 | Jung ................. G06F 3/03 345/156 |
| 2014/0098095 A1 | 4/2014 | Lee et al. |
| 2014/0118317 A1 | 5/2014 | Song et al. |
| 2014/0152553 A1* | 6/2014 | Cha .................. G06F 3/013 345/156 |
| 2015/0042674 A1* | 2/2015 | Lin .................. G09G 5/14 345/619 |
| 2015/0154936 A1* | 6/2015 | Lee .................. G09G 5/006 345/173 |
| 2015/0220195 A1* | 8/2015 | Jin .................. G06F 1/1643 345/173 |
| 2015/0227225 A1* | 8/2015 | Park .................. G06F 1/1641 345/173 |
| 2016/0033999 A1* | 2/2016 | Browning ............ G06F 1/1652 345/667 |

OTHER PUBLICATIONS

M. Khalibeigi et al., "FoldMe: Interacting with Double-sided Foldable Displays." ACM, TEI 2012, pp. 1-8.
Anonymous, "Bend Sensors: Detects Bending, Movement, Vibration, Humidity, and More." Inventables, Inc., 2015. Web. Mar. 17, 2015. <www.inventables.com/technologies/bend-sensor>, pp. 1-4.

* cited by examiner

MANAGING DISPLAYED CONTENT ON A RESHAPED FLEXIBLE DISPLAY

BACKGROUND

The present disclosure relates to the field of displays on electronic devices, and specifically to flexible displays. Still more specifically, the present disclosure relates to managing how content is displayed on a flexible display that has been reshaped by a user.

A flexible display is a non-rigid electronic display. Flexible displays utilize a Flexible Liquid Crystal Display (FLCD), a Flexible Organic Light Emitting Diode display (FOLED), selectively illuminable nanodots, or other technologies that enable individual control of pixels on a flexible substrate.

Flexible displays allow an electronic device, such as a portable computer, monitoring system, etc. to display information without the limitations of a rigid display. That is, a rigid display often has a glass surface that is easily broken, and must be able to fit within a fixed space. A flexible display allows the display to be folded and otherwise manipulated according to the needs of the user. For example, if a user is watching a movie while seated in an airline seat, where space is limited, the flexible display can be reshaped to fit the space available to the user within the confines of his/her seat by folding, bending, and otherwise manipulating the flexible display.

However, reshaping a flexible display presents problems. For example, when a flexible display is folded in certain ways, portions of the flexible display are no longer visible to the user, since part of the display is covered up by other parts of the display, or part of the display is now facing away from the user. This issue is particularly problematic when the display is used with certain types of applications, such as video viewers, word processing, etc.

SUMMARY

In one or more embodiments of the present invention, a computer-implemented method manages displayed content on a reshaped flexible display. One or more processors detect a location of a bend in a flexible display, where the bend reshapes the flexible display to define at least two sections of the flexible display. One or more processors identify a type of application being used to generate content that is displayed on the flexible display, and then divide the content into a first content portion and a second content portion, based on the type of application being used. One or more processors then display the first content portion on a first section of the flexible display and the second content portion on a second section of the flexible display. This embodiment provides a new and useful improvement over the prior art by selectively reallocating displayed content on the reshaped flexible display based both on the new shape of the flexible display as well as the type of application that is using the flexible display.

In an embodiment of the present invention, the content is initially displayed on all of the flexible display. One or more processors detect a location of a first bend in the flexible display and a second bend in the flexible display, where the first bend and the second bend create a visible area of the flexible display and a visually hidden area of the flexible display. The processor then generates a resized content by resizing the content that is initially displayed on all of the flexible display to fit on the visible area on the flexible display, and displays the resized content on the flexible display. This embodiment provides a new and useful improvement over the prior art by not only adjusting where content is displayed on the reshaped flexible display, but also resizing the content to comport with the newly-limited visible areas on the flexible display.

In an embodiment of the present invention, content is initially displayed on all of the flexible display. One or more processors detect a location of a first bend in the flexible display and a second bend in the flexible display, where the first bend and the second bend create a visually hidden area of the flexible display, a first visible area of the flexible display, and a second visible area of the flexible display. The processor also detects a mechanical cinching of the first visible area of the flexible display to the second visible area of the flexible display to form a composite visible area of the flexible display, and then generates and displays resized content by resizing the content that is initially displayed on all the flexible display to fit on the composite visible area of the flexible display. This embodiment provides an improvement over the prior art by confirming where the flexible display is being bent by detection of the mechanical cinching.

In an embodiment of the present invention, one or more processors receive an output from the sensor associated with the flexible display. Output from the sensor identifies a position of a user's face relative to the first section of the flexible display and the second section of the flexible display. Based on the output from the sensor, the processor determines that the first section of the flexible display faces directly toward the user's face and that the second section of the flexible display faces obliquely toward the user's face. Based on this determination, application content (e.g., a video, a text document, etc.) is displayed on the first section of the flexible display and a touch screen input device (e.g., a virtual keyboard) is displayed on the second section of the flexible display. This provides a new and useful improvement over the prior art by delegating a newly-folded portion of the flexible display to display application content (e.g., videos, text documents, etc.) while keeping the virtual keyboard in a more ergonomically neutral portion of the flexible display.

In an embodiment of the present invention a computer program product manages displayed content on a reshaped flexible display. The computer program product includes a non-transitory computer readable storage medium that has program code embodied therewith. The program code is readable and executable by a processor to perform a method that includes: detecting a location of a bend in a flexible display, where the bend reshapes the flexible display to define at least two sections of the flexible display; identifying a type of application being used to generate content that is displayed on the flexible display; dividing the content into a first content portion and a second content portion, where dividing the content is based on the type of application being used; and displaying the first content portion on a first section of the flexible display and the second content portion on a second section of the flexible display.

In an embodiment of the present invention, a computer system includes a processor, a computer readable memory, and a non-transitory computer readable storage medium. First program instructions, when executed by the processor, detect a location of a bend in a flexible display, where the bend reshapes the flexible display to define at least two sections of the flexible display. Second program instructions, when executed by a processor, identify a type of application being used to generate content that is displayed on the flexible display. Third program instructions, when executed by a processor, divide the content into a first content portion and a second content portion, where dividing the content is based on the type of application being used. Fourth program instructions, when executed by a processor, display the first content portion on a first section of the flexible display and the second content portion on a second section of the flexible display.

DETAILED DESCRIPTION

Figure 1:
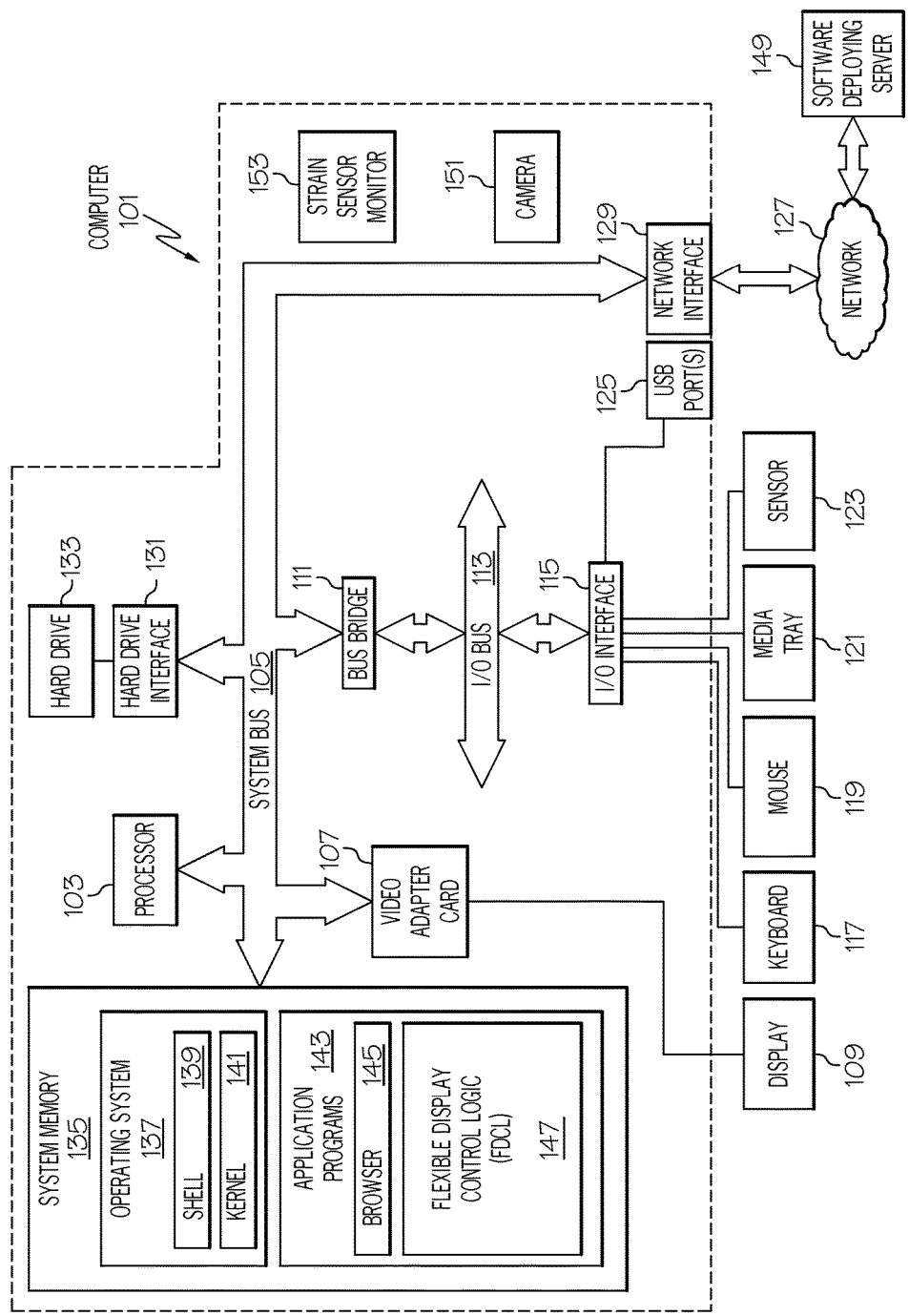
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 101 may be utilized by software deploying server 149.

Exemplary computer 101 includes a processor 103 that is coupled to a system bus 105. Processor 103 may utilize one or more processors, each of which has one or more processor cores. A video adapter card 107, which drives/supports a display 109, is also coupled to system bus 105. In one or more embodiments of the present invention, video adapter card 107 is a hardware video card. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a sensor 123, and external USB port(s) 125. While the format of the ports connected to I/O interface 115 may be any known to those skilled in the art of computer architecture, in one embodiment some or all of these ports are universal serial bus (USB) ports.

In one or more embodiments, sensor 123 is a biometric sensor that is able to determine where a user is looking. For example, sensor 123 may be an array of heat sensors that detects facial heat. Using the array of heat sensors to quantify the amount of heat being received by the array, the direction that the user is looking can be derived. Similarly, the biometric sensor may be an eye scanner, which is able to detect exactly where a user is looking.

As depicted, computer 101 is able to communicate with a software deploying server 149, using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include a Flexible Display Control Logic (FDCL) 147. FDCL 147 includes code for implementing the processes described below, including those described in FIGS. 2-5. In one embodiment, computer 101 is able to download FDCL 147 from software deploying server 149, including in an on-demand basis, wherein the code in FDCL 147 is not downloaded until needed for execution. Note further that, in one embodiment of the present invention, software deploying server 149 performs all of the functions associated with the present invention (including execution of FDCL 147), thus freeing computer 101 from having to use its own internal computing resources to execute FDCL 147.

In one or more embodiments of the present invention, computer 101 includes a camera 151, which is able to take a photograph or video image of a user of the computer 101 and/or the display 109.

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
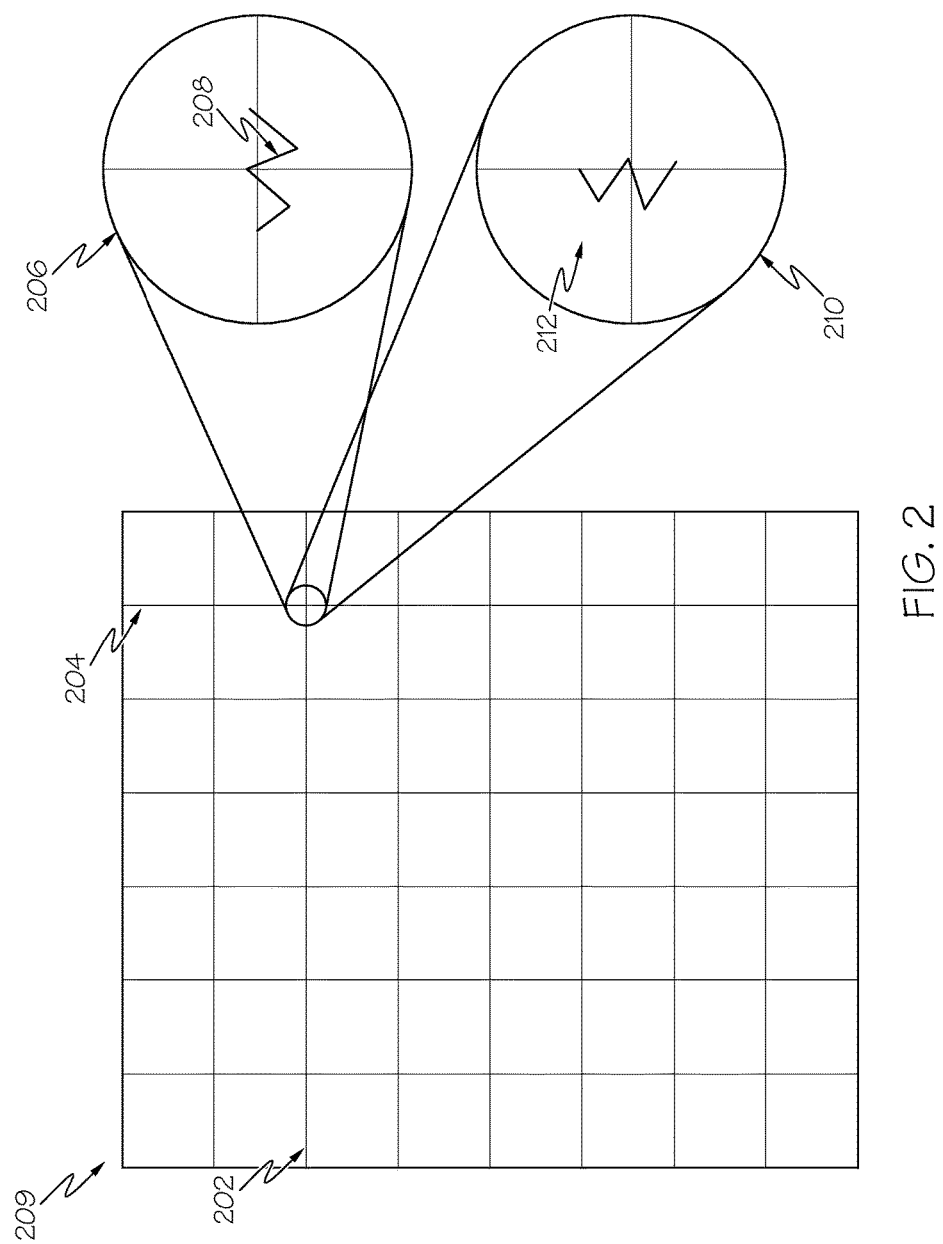
FIG. 2 illustrates an flexible display used in one or more embodiments of the present invention.

With reference now to FIG. 2, a flexible display 209 (analogous to display 109 shown in FIG. 1) used in one or more embodiments of the present invention is presented. That is, flexible display 209 is supported by the hardware and software shown in computer 101 in FIG. 1 to display content such as videos, text documents, webpages, test device outputs, etc.

Within flexible display 209 is an array of light-emitting devices (not shown), such as those found in a Flexible Liquid Crystal Display (FLCD), a Flexible Organic Light Emitting Diode display (FOLED), and/or similar displays that are able to selectively illuminate nanodots or other technologies, thereby enabling the individual control of pixels on a flexible substrate.

Also within flexible display 209 is an array of bend detectors that detect when the flexible display 209 is bent, folded, or otherwise physically reshaped. For example, consider line 202, which intersects line 204. Line 202 and line 204 are both physical conductors as well as position identifiers for where the flexible display 209 is currently being bent/folded/etc. Coupled to lines 202/204 are sensors that detect the bending/folding of the flexible display 209.

For example, consider magnification circle 206, which shows the intersection of line 202 and line 204. At this intersection is a sensor 208, which detects the amount of bend/rotation around line 204. Sensor 208 may be any type of strain gauge that is able to detect this bend/rotation. In a simple example, assume that sensor 208 is a conductor material that changes its resistance when stretched or compressed. This change in resistance is detected by a monitoring system (e.g., strain sensor monitor 153 shown in FIG. 1), which uses a multiplexor or similar hardware to identify the location of the sensor 208. If the flexible display 209 rotates in one direction about the line 204 (e.g., away from the page in the figure), then the resistance of the sensor 208 may go down (due to the sensor 208 being compressed, thus causing a larger diameter of the sensor 208). Similarly, if the flexible display 209 rotates in another direction about the line 204 (e.g., into the page in the figure), then the resistance of the sensor 208 may go up (due to the sensor 208 being elongated, thus causing a smaller diameter of the sensor 208).

As shown in magnification circle 210, the intersection of line 202 and line 204 also includes a sensor 212, which detects the amount of bend/rotation around line 202. Sensor 212 may be the same type of strain gauge as sensor 208 or another type of strain gauge. Assuming that sensor 212 is similar in nature to sensor 208, and that sensor 212 is likewise monitored by a monitoring system such as strain sensor monitor 153 shown in FIG. 1, then if the flexible display 209 rotates in one direction about the line 202 (e.g., away from the page in the figure), then the resistance of the sensor 212 may go down. Similarly, if the flexible display 209 rotates in another direction about the line 202 (e.g., into the page in the figure), then the resistance of the sensor 212 may go up.

Thus, the system is able to detect where bends/folds occur within the flexible display 209, and the degree (angular movement) of such bends/folds.

Figure 3:
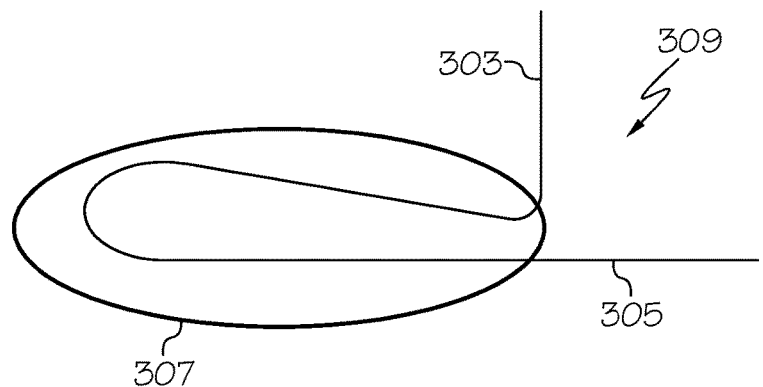
FIGS. 3-4 depict content being reallocated to different areas of a flexible display based on a shape of the flexible display and a type of application that is using the flexible display.

With reference now to FIG. 3, assume that a flexible display 309 (analogous to the flexible display 109/209 described above) has been folded/bent into the shape shown. Assume further that the visible region of the flexible display 309 is on the right side of the first section 303 of the flexible display 309, and is on the top side of the second section 305 of the flexible display 309. This bending/folding of the flexible display 309 results in two visible regions (the right side of the first section 303 and the top side of the second section 305). The portion of flexible display 309 shown as visually hidden area 307 is not visible, since the display areas are folded in on themselves in this area. However, as described herein, the present invention optimizes the use of the first section 303 and the second section 305 based not only on how much display real estate they provide, but also based on what type of application is running on the system.

Software installed in the electronic device will identify the content that is being displayed or will be displayed on the flexible display based on the type of application that is being run. That is, an operating system running on a computer understands what type of application is currently running and being displayed on the flexible display. Once the software (e.g., operating system) understands what displayable area is available and in what configuration, it will arrange the display of content generated by the currently running type of application on that displayable area.

Figure 4:
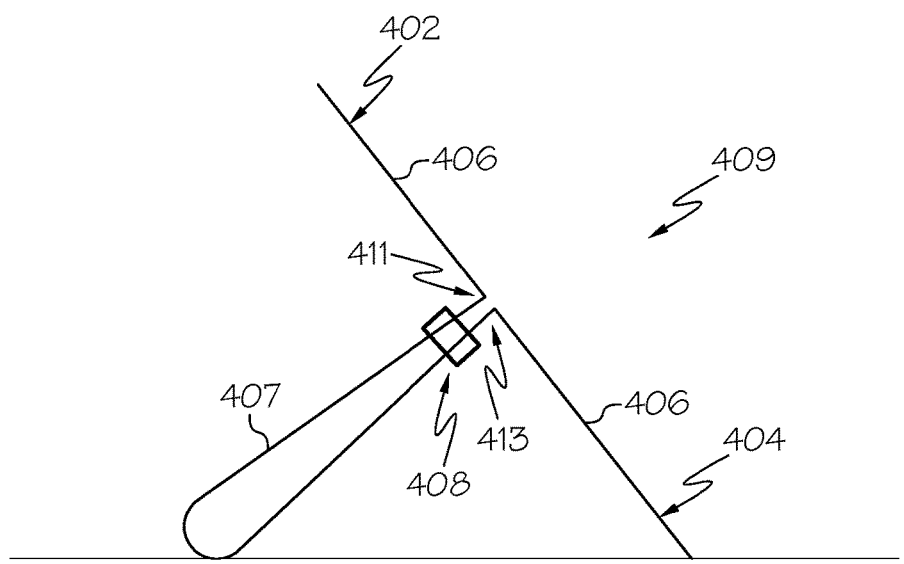

With reference now to FIG. 4, a flexible display 409 (analogous to flexible displays 109/209/309 presented above) is folded into a shape that allows a visually hidden area 407 to act as a monitor stand, while creating a first visible area 402 and a second visible area 404. Note that the first visible area 402 and the second visible area 404 are planar (i.e., align on a same plane) to create a composite visible area 406. As described herein, this composite visible area 406 can act like a single display area by cinching together the first visible area 402 with the second visible area 404.

In one or more embodiments of the present invention, a mechanical cinching connector 408 cinches the first visible area 402 to the second visible area 404. The mechanical cinching connector 408 may be a pair of magnets embedded in or otherwise affixed to the flexible display 409, a metallic clip, or any other type of mechanical coupler. The mechanical cinching connector 408 thus provides further information regarding where the flexible display 409 is being bent.

For example, assume that metal and/or ferromagnetic sensors (not shown) are embedded within the flexible display 409. When two magnets or a metallic clip cinch the flexible display 409 as shown in FIG. 4, then these metal and/or ferromagnetic sensors, which are electrically coupled to a monitoring system such as strain sensor monitor 153 shown in FIG. 1, notify the system where the bend is occurring on the flexible display 409.

In one or more embodiments of the present invention, detecting the mechanical cinching connector 408 is achieved through proximity sensing. Proximity sensors emit electromagnetic fields or beams and look for changes in the field or return signal. An inductive proximity sensor requires a metal target, which allows such a sensor to selectively identify the mechanical cinching connector 408. In one or more embodiments of the present invention, the sensitivity of the inductive proximity sensor is set to a level that matches the size (e.g., less than a half inch in thickness) of the mechanical cinching connector 408.

In an alternative embodiment, the first visible area 402 is clamped to the second visible area 404, thus ensuring a seamless look for the composite visible area 406.

Figure 5:
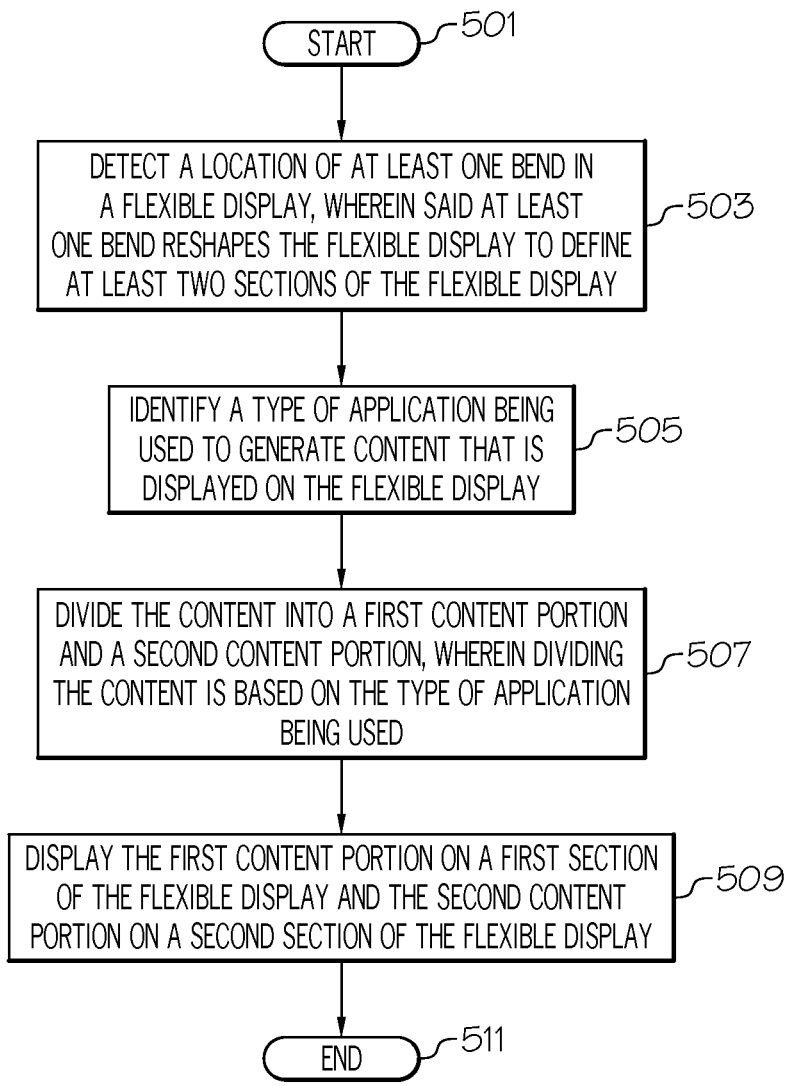
FIG. 5 is a high level flow-chart of one or more operations performed by one or more processors and/or other hardware devices to manage displayed content on a flexible display.

With reference now to FIG. 5, a high level flow-chart of one or more operations performed by one or more processors and/or other hardware devices to manage displayed content on a reshaped (e.g., bent, folded, etc.) flexible display is presented.

After initiator block 501, one or more processors detect a location of at least one bend in a flexible display, as described in block 503. As shown in FIG. 3 and FIG. 4, these bend(s) reshape the flexible display to define at least two sections of the flexible display.

As described in block 505, one or more processors identify a type of application being used to generate content that is displayed on the flexible display. For example, if the flexible display is supporting a video application, the use of the available display area on the flexible display after being folded will be different than the use of the available display by a word processing application.

As described in block 507, one or more processors divide the content (from the running application) into a first content portion and a second content portion, based on the type of application being used. For example, if the running application is a word processing application that uses a virtual touch-screen keyboard, then the first content portion may be the word document being processed, while the second content portion may be the virtual touch-screen keyboard. However, if the running application is a video application (e.g., an application that allows a user to view a movie on an electronic device that has a flexible display), then the first content portion may be a left/top side of the movie while the second content portion is the right/bottom side of the movie.

As described in block 509, one or more processors then display the first content portion on a first section of the flexible display and the second content portion on a second section of the flexible display.

In an embodiment of the present invention, the content (created by the currently running application) is initially displayed on all of the flexible display, and the method further includes the following operations.

One or more processors detect a location of a first bend in the flexible display and a second bend in the flexible display, where the first bend and the second bend create a visible area of the flexible display and a visually hidden area of the flexible display; (see FIG. 3 and FIG. 4). One or more processors generate a resized content by resizing the content that is initially displayed on all the flexible display to fit on the visible area on the flexible display, and then display the resized content on the visible area of the flexible display. For example, in FIG. 4, assume that a movie was originally being displayed on all of the flexible display 409. However, after being bent as shown in FIG. 4, only the reduced display real estate from the composite visible area 406 is now available. Thus, the movie is "shrunk down" so that it can fit on this composite visible area 406.

Thus, as shown in FIG. 4, in an embodiment of the present invention the content is initially displayed on all of the flexible display. One or more processors detect a location of a first bend in the flexible display and a second bend in the flexible display (e.g., bend 411 and bend 413 in FIG. 4). The first bend and the second bend create a visually hidden area of the flexible display (e.g., visually hidden area 407 in FIG. 4), a first visible area of the flexible display (e.g., first visible area 402 in FIG. 4), and a second visible area of the flexible display (e.g., second visible area 404 in FIG. 4). One or more processors detect a mechanical cinching of the first visible area of the flexible display to the second visible area of the flexible display (e.g., the mechanical cinching connector 408 shown in FIG. 4) to form a composite visible area of the flexible display (e.g., composite visible area 406). One or more processors then resize the content that is initially displayed on all of the flexible display to fit on the composite visible area of the flexible display, where it is displayed.

In an embodiment of the present invention, one particular type of application uses an input device to alter application content, such as a touch-screen virtual keyboard, a touch-screen virtual cursor control, etc. In this embodiment, one or more processors display the application content on the first section of the flexible display and the input device on the second section of the flexible display. For example, in FIG. 3, the first section 303 may display a text document while the second section 305 may display the virtual touch-screen keyboard used by the running word processing application.

In an embodiment of the present invention, in which the flexible display is part of an electronic device that has a sensor and is used by a user, one or more processors receive an output from the sensor (e.g., camera 151 shown in FIG. 1). The output from the sensor identifies a position of a user's face relative to the first section of the flexible display and the second section of the flexible display. Thus, if the sensor is a camera, then facial recognition and positioning software will determine where the user is looking. In another embodiment, the sensor is a sensor such as sensor 123 shown in FIG. 1, which may detect facial heat, eye positioning, etc. to determine where the user is looking. Based on the output from the sensor, one or more processors then determine that the first section of the flexible display faces directly toward the user's face and that the second section of the flexible display faces obliquely toward the user's face, thus allowing the system to place the different portions of the originally displayed content on the various new sections of the flexible display.

In an embodiment of the present invention, one or more processors lock a display of the first content portion on a first section of the flexible display and the second content portion on a second section of the flexible display. Thus, if any newly-detected bends in the flexible display occur, they are ignored and the information display remains the same. This prevents the system from altering the display every time a minor bend occurs. That is, if the new bend does not affect the display of the content, then it is ignored.

In an embodiment of the present invention, one or more processors determine a first content percentage of the content, where the first content percentage is a percentage of the content that is represented by the first content portion, and then determine a second content percentage of the content, where the second content percentage is a percentage of the content that is represented by the second content portion. One or more processors also determine a first display percentage of the flexible display, where the first display percentage is a percentage of the display taken by the first section of the flexible display, and then determine a second display percentage of the flexible display, where the second display percentage is a percentage of the display taken by the second section of the flexible display. The processors match the first content percentage to the first display percentage and the second content percentage to the second display percentage, and then display the first content on the first section of the flexible display and the second content on the second section of the flexible display without resizing the first content portion or the second content portion. That is, assume that that the first section and the second section together make up a composite display, and that the first section makes up 40% of the composite display while the second section makes up 60% of the composite display. Based on these percentages, then 40% of the media being displayed (e.g., the top 40% of a movie screen) is displayed on the first section, while the remaining 60% (e.g., the bottom 60% of the movie screen) is displayed on the second section.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of managing displayed content on a reshaped flexible display, the computer-implemented method comprising:
   detecting, by a processor, a location of at least one bend in a flexible display, wherein said at least one bend reshapes the flexible display to define at least two sections of the flexible display;
   identifying, by the processor, a type of application being used to generate content that is displayed on the flexible display, wherein the content is initially displayed on all of the flexible display;
   dividing, by the processor, the content into a first content portion and a second content portion, wherein dividing the content is based on the type of application being used;
   displaying, by the processor, the first content portion on a first section of the flexible display and the second content portion on a second section of the flexible display;
   detecting, by the processor, a location of a first bend in the flexible display and a second bend in the flexible display, wherein the first bend and the second bend create a visually hidden area of the flexible display, a first visible area of the flexible display, and a second visible area of the flexible display;
   detecting, by the processor, a mechanical cinching of the first visible area of the flexible display to the second visible area of the flexible display to form a composite visible area of the flexible display, wherein the mechanical cinching is achieved by a mechanical device at the first bend and the second bend that holds the first bend to the second bend;
   generating, by the processor, a resized content by resizing the content that is initially displayed on all of the flexible display to fit on the composite visible area of the flexible display; and
   displaying, by the processor, the resized content on the composite visible area of the flexible display.

2. The computer-implemented method of claim 1, wherein the mechanical cinching is achieved by a metal clip that secures the first bend to the second bend, and wherein the computer-implemented method further comprises:
   receiving, by the processor, a location of an inductive proximity sensor on the flexible display;
   receiving, by the processor, a return signal from the inductive proximity sensor indicating a presence of the metal clip at the location of the inductive proximity sensor on the flexible display; and
   determining, by the processor, a location of the first bend and the second bend based on the return signal from the inductive proximity sensor at the location of the inductive proximity sensor on the flexible display.

3. The computer-implemented method of claim 1, wherein the mechanical cinching is achieved by magnets that are embedded at the first bend and the second bend, wherein the magnets hold the first bend to the second bend, and wherein the computer-implemented method further comprises:
   receiving, by the processor, a location of the magnets in the flexible display; and
   determining, by the processor, a location of the first bend and the second bend based on the location of the magnets in the flexible display.

4. The computer-implemented method of claim 1, further comprising:
   displaying, by the processor, application content on the first section of the flexible display; and
   displaying, by the processor, an input device on the second section of the flexible display.

5. The computer-implemented method of claim 1, wherein the flexible display is part of an electronic device that comprises a sensor, wherein the electronic device is in use by a user, and wherein the computer-implemented method further comprises:
   receiving, by the processor, an output from the sensor, wherein the output from the sensor identifies a position of a user's face relative to the first section of the flexible display and the second section of the flexible display; and
   determining, by the processor and based on the output from the sensor, that the first section of the flexible display faces directly toward the user's face and that the second section of the flexible display faces obliquely toward the user's face.

6. The computer-implemented method of claim 1, further comprising:
   locking, by the processor, a display of the first content portion on the first section of the flexible display and the second content portion on the second section of the flexible display, wherein said locking ignores any newly-detected bends in the flexible display.

7. The computer-implemented method of claim 1, further comprising:
   determining, by the processor, a first content percentage of the content, wherein the first content percentage is a percentage of the content that is represented by the first content portion;

determining, by the processor, a second content percentage of the content, wherein the second content percentage is a percentage of the content that is represented by the second content portion;

determining, by the processor, a first display percentage of the flexible display, wherein the first display percentage is a percentage of the display taken by the first section of the flexible display;

determining, by the processor, a second display percentage of the flexible display, wherein the second display percentage is a percentage of the display taken by the second section of the flexible display;

matching, by the processor, the first content percentage to the first display percentage and the second content percentage to the second display percentage; and displaying, by the processor, the first content on the first section of the flexible display and the second content on the second section of the flexible display without resizing the first content portion or the second content portion.

8. A computer program product for managing displayed content on a reshaped flexible display, wherein the content is initially displayed on all of a flexible display, and wherein the computer program product comprises a non-transitory computer readable storage medium having program code embodied therewith, the program code readable and executable by a processor to perform a method comprising:

detecting a location of a first bend in the flexible display and a second bend in the flexible display, wherein the first bend and the second bend create a visually hidden area of the flexible display, a first visible area of the flexible display, and a second visible area of the flexible display;

detecting a mechanical cinching of the first visible area of the flexible display to the second visible area of the flexible display to form a composite visible area of the flexible display;

generating a resized content by resizing the content that is initially displayed on all of the flexible display to fit on the composite visible area of the flexible display; and displaying the resized content on the composite visible area of the flexible display.

9. The computer program product of claim 8, wherein the mechanical cinching is achieved by a metal clip that secures the first bend to the second bend, and wherein the method further comprises:

receiving a location of an inductive proximity sensor on the flexible display;

receiving a return signal from the inductive proximity sensor indicating a presence of the metal clip at the location of the inductive proximity sensor on the flexible display; and determining a location of the first bend and the second bend based on the return signal from the inductive proximity sensor at the location of the inductive proximity sensor on the flexible display.

10. The computer program product of claim 8, wherein the mechanical cinching is achieved by magnets that are embedded at the first bend and the second bend, wherein the magnets hold the first bend to the second bend, and wherein the method further comprises:

receiving a location of the magnets in the flexible display; and determining a location of the first bend and the second bend based on the location of the magnets in the flexible display.

11. The computer program product of claim 8, wherein the method further comprises:

displaying application content on the first section of the flexible display; and displaying an input device on the second section of the flexible display.

12. The computer program product of claim 8, wherein the flexible display is part of an electronic device that comprises a sensor, wherein the electronic device is in use by a user, and wherein the method further comprises:

receiving an output from the sensor, wherein the output from the sensor identifies a position of a user's face relative to the first section of the flexible display and the second section of the flexible display; and determining, based on the output from the sensor, that the first section of the flexible display faces directly toward the user's face and that the second section of the flexible display faces obliquely toward the user's face.

13. The computer program product of claim 8, wherein the method further comprises:

locking a display of the flexible display, wherein said locking ignores any newly-detected bends in the flexible display.

14. The computer program product of claim 8, wherein the method further comprises:

determining a first content percentage of the content, wherein the first content percentage is a percentage of the content that is represented by the first content portion;

determining a second content percentage of the content, wherein the second content percentage is a percentage of the content that is represented by the second content portion;

determining a first display percentage of the flexible display, wherein the first display percentage is a percentage of the display taken by the first section of the flexible display;

determining a second display percentage of the flexible display, wherein the second display percentage is a percentage of the display taken by the second section of the flexible display;

matching the first content percentage to the first display percentage and the second content percentage to the second display percentage; and displaying the first content on the first section of the flexible display and the second content on the second section of the flexible display without resizing the first content portion or the second content portion.

15. A computer system comprising:

a processor, a computer readable memory, and a non-transitory computer readable storage medium;

first program instructions to detect a location of a first bend in the flexible display and a second bend in the flexible display, wherein the first bend and the second bend create a visually hidden area of the flexible display, a first visible area of the flexible display, and a second visible area of the flexible display;

second program instructions to detect a mechanical cinching of the first visible area of the flexible display to the second visible area of the flexible display to form a composite visible area of the flexible display;

third program instructions to generate a resized content by resizing the content that is initially displayed on all of the flexible display to fit on the composite visible area of the flexible display; and fourth program instructions to display the resized content on the composite visible area of the flexible display; and wherein the first, second, third, and fourth program instructions are stored on the non-transitory computer readable storage medium for execution by one or more processors via the computer readable memory.

16. The computer system of claim 15, wherein the mechanical cinching is achieved by a metal clip that secures the first bend to the second bend, and wherein the computer system further comprises:

fifth program instructions to receive a location of an inductive proximity sensor on the flexible display;

sixth program instructions to receive a return signal from the inductive proximity sensor indicating a presence of the metal clip at the location of the inductive proximity sensor on the flexible display; and seventh program instructions to determine a location of the first bend and the second bend based on the return signal from the inductive proximity sensor at the location of the inductive proximity sensor on the flexible display; and wherein the fifth, sixth, and seventh program instructions are stored on the non-transitory computer readable storage medium for execution by one or more processors via the computer readable memory.

17. The computer system of claim 15, wherein the mechanical cinching is achieved by magnets that are embedded at the first bend and the second bend, wherein the magnets hold the first bend to the second bend, and wherein the computer system further comprises:

fifth program instructions to receive a location of the magnets in the flexible display; and sixth program instructions to determine a location of the first bend and the second bend based on the location of the magnets in the flexible display; and wherein the fifth and sixth program instructions are stored on the non-transitory computer readable storage medium for execution by one or more processors via the computer readable memory.

18. The computer system of claim 15, further comprising:

fifth program instructions to receive an output from the sensor, wherein the output from the sensor identifies a position of a user's face relative to the first section of the flexible display and the second section of the flexible display;

sixth program instructions to determine, based on the output from the sensor, that the first section of the flexible display faces directly toward the user's face and that the second section of the flexible display faces obliquely toward the user's face;

seventh program instructions to display application content on the first section of the flexible display; and eighth program instructions to display an input device on the second section of the flexible display; and wherein the fifth, sixth, seventh, and eighth program instructions are stored on the non-transitory computer readable storage medium for execution by one or more processors via the computer readable memory.

19. The computer system of claim 15, further comprising:

fifth program instructions to lock the flexible display, wherein locking the flexible display ignores any newly-detected bends in the flexible display; and wherein the fifth program instructions are stored on the non-transitory computer readable storage medium for execution by one or more processors via the computer readable memory.

20. The computer system of claim 15, further comprising:

fifth program instructions to determine a first content percentage of the content, wherein the first content percentage is a percentage of the content that is represented by the first content portion;

sixth program instructions to determine a second content percentage of the content, wherein the second content percentage is a percentage of the content that is represented by the second content portion;

seventh program instructions to determine a first display percentage of the flexible display, wherein the first display percentage is a percentage of the display taken by the first section of the flexible display;

eighth program instructions to determine a second display percentage of the flexible display, wherein the second display percentage is a percentage of the display taken by the second section of the flexible display;

ninth program instructions to match the first content percentage to the first display percentage and the second content percentage to the second display percentage; and tenth program instructions to display the first content on the first section of the flexible display and the second content on the second section of the flexible display without resizing the first content portion or the second content portion; and wherein the fifth, sixth, seventh, eighth, ninth, and tenth program instructions are stored on the non-transitory computer readable storage medium for execution by one or more processors via the computer readable memory.

\* \* \* \* \*